(12) United States Patent
Yan et al.

(10) Patent No.: US 8,355,435 B2
(45) Date of Patent: Jan. 15, 2013

(54) TRANSMISSION OF PACKET DATA

(75) Inventors: Yong Yan, Austin, TX (US); Yolanda Prieto, Coral Gables, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 1600 days.

(21) Appl. No.: 11/763,914

(22) Filed: Jun. 15, 2007

(65) Prior Publication Data
US 2008/0310505 A1 Dec. 18, 2008

(51) Int. Cl.
*H04N 7/26* (2006.01)
(52) U.S. Cl. .............................. 375/240.03; 375/240.02
(58) Field of Classification Search ........................ None
See application file for complete search history.

(56) References Cited

U.S. PATENT DOCUMENTS

| | | | |
|---|---|---|---|
| 6,744,738 B1 | 6/2004 | Park et al. | |
| 6,862,278 B1* | 3/2005 | Chang et al. | 370/389 |
| 2001/0008556 A1* | 7/2001 | Bauer et al. | 379/265.06 |
| 2002/0045458 A1 | 4/2002 | Parantainen et al. | |
| 2004/0013202 A1* | 1/2004 | Lainema | 375/240.18 |
| 2005/0002453 A1* | 1/2005 | Chang et al. | 375/240.03 |
| 2005/0114395 A1* | 5/2005 | Muralidharan | 707/104.1 |
| 2005/0190745 A1* | 9/2005 | Western et al. | 370/352 |
| 2008/0046588 A1* | 2/2008 | Deshpande et al. | 709/236 |

FOREIGN PATENT DOCUMENTS

WO 03092208 A1 11/2003

OTHER PUBLICATIONS

Enrico Masala, Hua Yang, Kenneth Rose, Juan Carlos De Martin, Rate-Distortion Optimized Slicing, Packetization and Coding for Error Resilient Video Transmission, 2004, IEEE.*
Stockhammer et al; "H.264/AVC in Wireless Environments"; IEEE Transactions on Circuits and Systems for Video Technology, vol. 13, No. 7, Jul. 2003.
International Search Report issued in coordinating PCT Application No. PCT/US08/064287 mailed Oct. 7, 2008.

* cited by examiner

*Primary Examiner* — Thai Tran
*Assistant Examiner* — Sunghyoun Park
(74) *Attorney, Agent, or Firm* — James L. Clingan, Jr.

(57) ABSTRACT

A method for transmitting encoded video data includes determining an available space for transmitting an encoded video data in a last remaining information block of a video packet. The method further includes if the available space is sufficient, based on a comparison of the an estimated size of the encoded video data with the available space, then transmitting the encoded video data using the last remaining information block of the video packet. The method further includes if the available space is insufficient, changing a coding scheme associated with the encoded video data to transform the encoded video data into reduced size video data and transmitting the reduced size video data using the last remaining information block of the video packet.

14 Claims, 2 Drawing Sheets

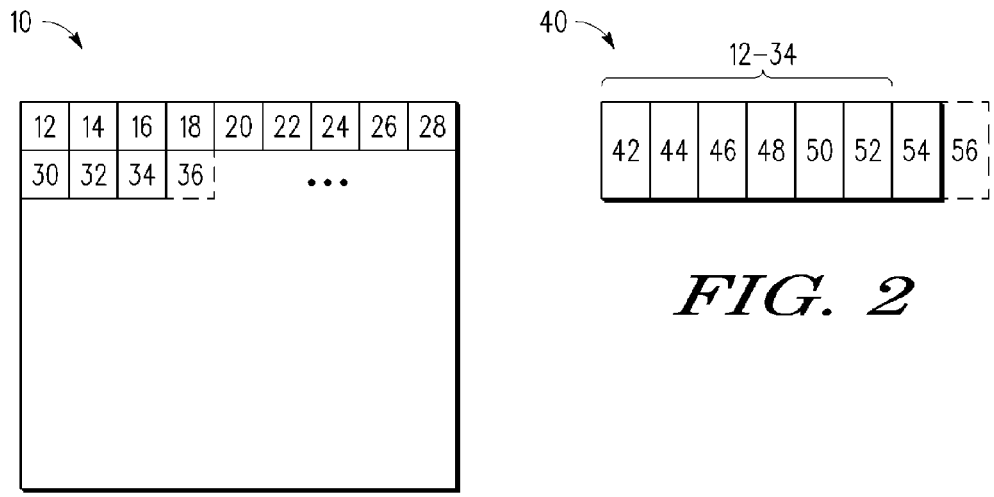
FIG. 1
FIG. 2
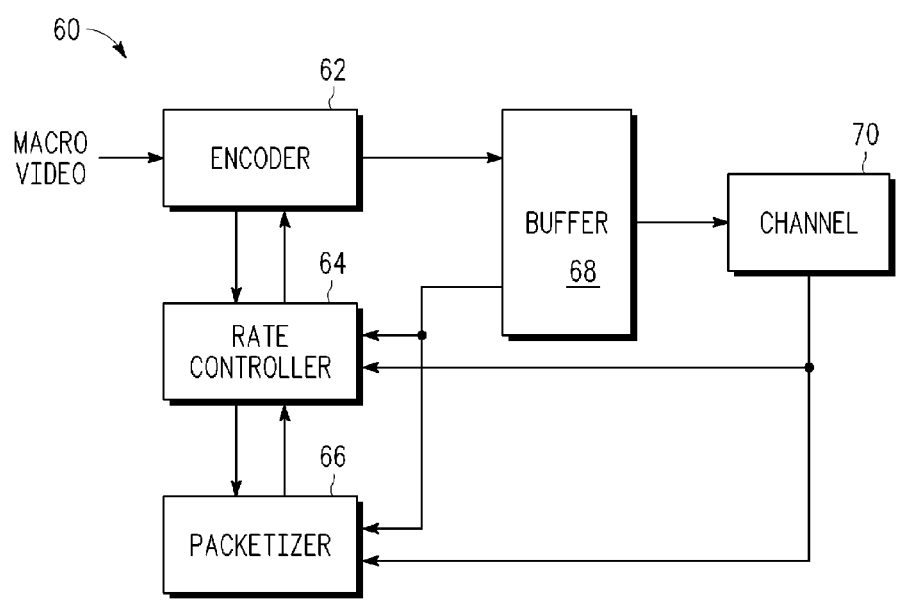
FIG. 3

TRANSMISSION OF PACKET DATA

BACKGROUND

1. Field

This disclosure relates generally to transmission of data and more specifically, to transmission of data in packets.

2. Related Art

Packet data is generally transmitted in situation where there is a central receiver and transmitter such as a base station or server in which data is being received from multiple sources by the central receiver. In such cases a portion of the relevant data is transmitted in a packet so that the many sources of data can be served instead of just exclusively one per channel. This is facilitated by the packet being organized into information blocks of a fixed number of bits for each information block. Although this information block size may vary from system to system and even within a system under certain circumstances, the packet size is an integer multiple of the size of information block size. Even if this constraint may result in some disadvantages, the constraint is considered necessary. On the other hand there would be a benefit in any improvement in throughput, the amount of information for a given time of transmission. Other constraints in this regard such as the environment of the transmission and the distance of the transmission play a role in how effectively the data is transmitted.

Accordingly, there is a need for improving the throughput in a packet data transmission.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 1 is an information block useful in embodiments of the invention;

FIG. 2 is a frame useful in embodiments of the invention;

FIG. 3 is a functional block diagram useful in implementing embodiments of the inventions;

DETAILED DESCRIPTION

Figure 4:
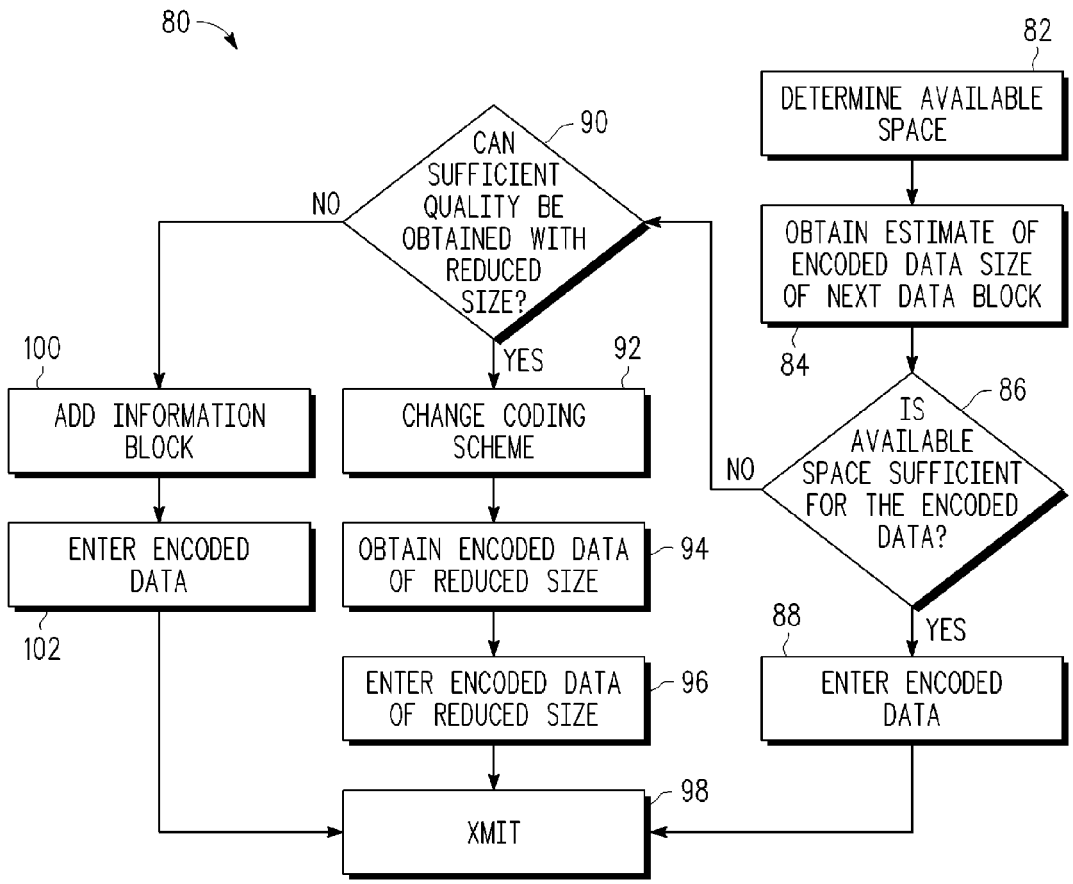
FIG. 4 is a flow chart useful in understanding embodiments of the inventions.

In one aspect a transmission of a frame of video is done by encoding segments of the frame and transmitting the encoded segments. Based on the complexity of different portions of the frame and the conditions of the channels under consideration, the encoded segments will vary in size. The transmission of the frame, which may be one of multiple frames in a video sequence, is achieved in multiple data packets each having a number of information blocks. Common sizes for such information blocks can easily vary from 478 to 1228 bits or even vary more than that. The data packets thus have a size that is a multiple of the size of information blocks. The sizes of the encoded segments depend on various encoder parameters such as quantization parameter, frame quality, motion in the frame, as well as any additional information the channel may add to conform to performance requirements such as error resiliency. That the summation of the sizes of the encoded segments also be a multiple of the size of information blocks is thus unlikely. Thus at the end of a packet there is likely to be unused bits that in the past were known to be put in a non-information bearing state. This process has been called padding. Instead of simply padding these available bits, the next encoded segment is analyzed to see if it can be reduced in size and still provide sufficient quality. Typical encoding schemes are generally easily adjustable to provide data output size that can be selected. A reduced size may reduce the quality, but the amount of reduction may often be insignificant. In such cases the size reduction is performed so as to fit in the available space. If sufficient quality is not available using that technique, an information segment is added to accommodate the next encoded segment. The unused bits in such case are then padded. An alternative is to increase the size of the encoded segment to fit into the otherwise unused bits to actually improve the quality of that encoded segment. In such cases where the reduced size is used the throughput is increased by increasing the information transmitted for a given packet size. Under some circumstances, an additional approach may include varying the information block size. Also any number of parameters for encoding may be selected by locations remote from the source of transmission. These parameters can be sent to the device wirelessly or wired so that further optimization within an information block or a series of information blocks can be performed to then reduce or eliminate the padded area in a packet.

Shown in FIG. 1 is a frame 10 comprising a plurality of macroblocks represented in part by macroblocks 12, 14, 16, 18, 20, 22, 24, 26, 28, 30, 32, 34, and 36. Frame 10 may be a still picture or one of many frames as part of a video sequence. Frame 10 is divided into equal macroblocks. Each macroblock may, without encoding, be represented by thousands of bits. Encoding, which is often used for compression, may bring this down by a typical range of 20 to 100 times.

Shown in FIG. 2 is a packet 40 comprising information blocks 42, 44, 46, 48, 50, 52, and 54. An information block 56 may also be added to packet 40. In this example, macroblocks 12, 14, 16, 18, 20, 22, 24, 26, 28, 30, 32, and 34 (12-34) have been encoded and loaded into information blocks 42, 44, 46, 48, 50, and 52 (42-52) and a portion of information block 54. In this example, packet 40 can have only one more information block added to it beyond information block 54 so that either information block 54 or information block 56 will be the last information block of packet 40, and encoded macroblock 36 is too large to fit in the remaining space of information block 54. If sufficient quality of the representation of macroblock 36 can be obtained with altered encoding then that reduced amount is loaded into information block 54, which then is the last information block. If that is not sufficient quality, then information block 56 is added and encoded block macroblock 36 is loaded. In such case information block 56 is the last information block of packet 40.

Shown in FIG. 3 is a system 60 useful in performing the operation described for loading the information representative of macroblock 36. System 60 comprises an encoder 62, a rate controller 64, a packetizer 66, a buffer 68, and a channel 70. Encoder 62 is coupled to buffer 68 and rate controller 64. Rate controller 64 is further coupled to buffer 68, channel 70, and packetizer 66. Packetizer 66 is further coupled to channel 70 and buffer 68. Buffer 68 is further coupled to channel 70. System 60 is shown in functional blocks in FIG. 3 that may be implemented in a microcomputer as a programmable solution. The functional blocks can be implemented in firmware such that actual hardware may be the same but would be operated under different software stored in read only memory (ROM) in the microcomputer. As an alternative, system 60 could be implemented in dedicated hardware. Rate controller 64 provides a commonly available function in packet transmission by providing the encoding parameters, such as a quantization parameter, to encoder 62. The encoding parameters are needed for quantizing texture data and motion data both of which may be either established based on a particular standard, a design decision, or remotely controlled. The remote control would occur through feedback from channel 70. Encoder 62, as is common, provides encoded data from the macroblock which is typically video information. The size of the data is based on inputs from the rate controller and the complexity of the portion of the picture being represented by the macroblock.

Shown in FIG. 4 is a flow chart showing a method 80 of operation of system 60 that may be used to achieve the loading of macroblock 36 into packet 40. In step 82, the available space in a packet is determined. This may be done by determining the total bits of packet 40 through information block 52 and subtracting from that the summation of the total bits for encoded macroblocks 12-34. This can be done by encoder 62.

In step 84, an estimate of the size of the encoded data is obtained. This is obtained by a conventional functional block inside encoder 62 based on an input from rate controller 64 for the particular macroblock being received. In the example of FIGS. 1 and 2 this would be macroblock 36.

In step 86 a decision is made as to whether there is space available for the encoded data in the packet. If so, the encoded data is entered into buffer 68 in step 88 and ultimately transmitted as shown in step 98. If there is not space available, there is then a decision in step 90 as to whether there is sufficient quality to be obtained with a reduced size available. Fairly obvious examples would be if there is only a one bit reduction required then it is almost certain that the quality would be sufficient. On the other hand if there was only one bit available, then it would be virtually certain that the quality reduction would be too great. There are criteria for determining the amount of quality reduction based on the bits required for a certain quality as compared to the amount of bits available. On the one hand, the perception of what is an excessive quality reduction may vary from person to person, the actual quality reduction is known to be able to be determined based on objective criteria. The determination is made by packetizer 66.

In step 100, if the decision is that sufficient quality cannot be obtained by the reduced-size encoded macroblock, which is limited by the available bits, an information block is added. This would be Information block 56 shown in FIG. 2. In such case the original encoded macroblock is loaded into the available space and into the added information block. This is then transmitted in step 98. In the unlikely event the added information block does not add enough space for the original encoded macroblock, the original encoded macroblock is quantized to a sufficiently smaller size. If the quality is acceptable, then the quantized macroblock is loaded into the unused bits and the added information block. If the quality is not sufficient, the unused bits are padded and no information block is added.

In step 92, if the decision is that sufficient quality can be obtained by the reduced-size encoded macroblock, the coding scheme is changed. Packetizer 66 provides the necessary input to rate controller 64 in order for rate controller 64 to direct encoder 62 to provide, in step 94, the reduced-size encoded data for macroblock using the changed coding scheme. In step 96, the reduced-size encoded data is then entered in buffer 68 and then transmitted in step 98.

Figure 5:
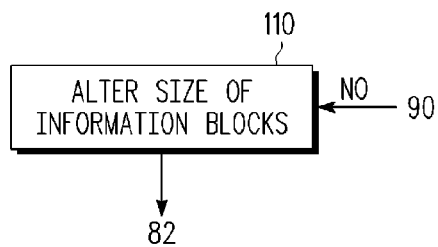
FIG. 5 is a block of a method step that may be added to the flow chart of FIG. 4 as further embodiment.

Shown in FIG. 5 is a possible additional step 110 to add to method 80 of FIG. 4. Step 110 provides for altering the size of the all of the information blocks after a "no" decision from step 90. This step may be available where system 60 decides the size of the information blocks. In such a system the receiver would be informed of the information block size at the time of transmission. After the Information block size change, the calculation as to available space would be made and the process continue as before.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

By now it should be understood that there is a method for transmitting encoded video data. The method includes obtaining an estimated size of encoded video data. The method further includes determining an available space for transmitting the encoded video data in a last remaining information block of a video packet. The method further includes, if the available space is sufficient, based on a comparison of the estimated size of the encoded video data with the available space, then transmitting the encoded video data using the last remaining information block of the video packet. The method further includes, if the available space is insufficient, determining whether a quality level corresponding to the encoded video data can be maintained despite a lack of availability of sufficient space, and if so changing a coding scheme associated with the encoded video data to transform the encoded video data into reduced size video data and transmitting the reduced size video data using the last remaining information block of the video packet. The method may further include, if the available space is insufficient, adding an information block to the video packet. The method may further include transmitting the encoded video block using the added information block. The method may further include padding any empty portion of the added information block prior to transmitting the encoded video block using the added information block. The method may further include changing the coding scheme associated with the encoded video data to transform the encoded video data into increased size video data and transmitting the increased size video data using the added information block. Changing the coding scheme associated with the encoded video data may further be characterized as changing a quantization parameter associated with the encoded video data. Changing the coding scheme associated with the encoded video data may further be characterized as changing a prediction mode associated with the encoded video data. If the available space if insufficient, the method may be further characterized as changing a size of the last remaining information block of the video packet. The method may further include altering information contained in an information block preceding the last information block to alter the available space.

Also there is a method for transmitting encoded video. The method includes receiving an information block size and a video packet size. The method further includes using an encoder, generating encoded video data for transmission such that the video packet size is substantially equal to a cumulative size needed by a plurality of information blocks used to transmit the encoded video data, wherein the video packet size is a function of at least one of a quantization parameter associated with the encoded video data, a buffer fullness indicator associated with the encoder used for encoding the encoded video data, and a granularity indicator of a rate control associated with the encoder. The method may be further characterized by the encoded video data being transmitted from a server to a client in a closed loop system. The method may be further characterized by the encoder being a part of the client and the server communicating the information block size and the video packet size to the encoder. Generating the encoded video data may further include eliminating or minimizing any required padding at an end of the plurality of information blocks used to transmit the encoded video data. The method may further include the encoder adjusting a number of bits used to generate each unit of the encoded video data based on the received information block size. The method may further be characterized by each unit of the encoded video data corresponding to a macro block.

There is also a method for transmitting encoded video data. The method includes determining an available space for transmitting an encoded video data in a last remaining information block of a video packet. The method further includes, if the available space is sufficient, based on a comparison of an estimated size of the encoded video data with the available space, then transmitting the encoded video data using the last remaining information block of the video packet. The method further includes, if the available space is insufficient, changing a coding scheme associated with the encoded video data to transform the encoded video data into reduced size video data and transmitting the reduced size video data using the last remaining information block of the video packet. The method may further include, if the available space is insufficient, adding an information block to the video packet. The method may further include transmitting the encoded video block using the added information block. The method may further include padding any empty portion of the added information block prior to transmitting the encoded video block using the added information block. The method may further include changing the coding scheme associated with the encoded video data to transform the encoded video data into increased size video data and transmitting the increased size video data using the added information block.

Although the invention is described herein with reference to specific embodiments, various modifications and changes can be made without departing from the scope of the present invention as set forth in the claims below. For example, only one macroblock is shown as having the number of bit reduced at encoding, this may be done to several encoded segments to average the reduction in bits over several encoded segments. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for transmitting encoded video data, comprising:
    obtaining an estimated size of encoded video data;
    determining an available space for transmitting the encoded video data in a last remaining information block of a video packet;
    if the available space is sufficient, based on a comparison of the estimated size of the encoded video data with the available space, then transmitting the encoded video data using the last remaining information block of the video packet; and
    if the available space is insufficient, determining whether a quality level corresponding to the encoded video data can be maintained despite a lack of availability of sufficient space, and if so changing a coding scheme associated with the encoded video data to transform the encoded video data into reduced size video data and transmitting the reduced size video data using the last remaining information block of the video packet.

2. The method of claim 1 further comprising, if the available space is insufficient, adding an information block to the video packet.

3. The method of claim 2 further comprising transmitting the encoded video block using the added information block.

4. The method of claim 3 further comprising padding any empty portion of the added information block prior to transmitting the encoded video block using the added information block.

5. The method of claim 3 further comprising changing the coding scheme associated with the encoded video data to transform the encoded video data into increased size video data and transmitting the increased size video data using the added information block.

6. The method of claim 1, wherein changing the coding scheme associated with the encoded video data comprises changing a quantization parameter associated with the encoded video data.

7. The method of claim 1, wherein changing the coding scheme associated with the encoded video data comprises changing a prediction mode associated with the encoded video data.

8. The method of claim 1, wherein, if the available space is insufficient, changing a size of the last remaining information block of the video packet.

9. The method of claim 1 further comprising altering information contained in an information block preceding the last information block to alter the available space.

10. A method for transmitting encoded video data, comprising:
    determining an available space for transmitting an encoded video data in a last remaining information block of a video packet;
    if the available space is sufficient, based on a comparison of an estimated size of the encoded video data with the available space, then transmitting the encoded video data using the last remaining information block of the video packet; and if the available space is insufficient, determining whether a quality level corresponding to the encoded video data can be maintained despite a lack of availability of sufficient space, changing a coding scheme associated with the encoded video data to transform the encoded video data into reduced size video data and transmitting the reduced size video data using the last remaining information block of the video packet.

11. The method of claim 10 further comprising, if the available space is insufficient, adding an information block to the video packet.

12. The method of claim 11 further comprising transmitting the encoded video block using the added information block.

13. The method of claim 12 further comprising padding any empty portion of the added information block prior to transmitting the encoded video block using the added information block.

14. The method of claim 12 further comprising changing the coding scheme associated with the encoded video data to transform the encoded video data into increased size video data and transmitting the increased size video data using the added information block.

* * * * *